(12) United States Patent
Sawada

(10) Patent No.: US 10,035,458 B2
(45) Date of Patent: Jul. 31, 2018

(54) IMAGE PROCESSING APPARATUS

(71) Applicant: FUJITSU TEN LIMITED, Kobe-shi, Hyogo (JP)

(72) Inventor: Yasuyoshi Sawada, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 138 days.

(21) Appl. No.: 15/202,863

(22) Filed: Jul. 6, 2016

(65) Prior Publication Data

US 2017/0034454 A1 Feb. 2, 2017

(30) Foreign Application Priority Data

Jul. 31, 2015 (JP) ................... 2015-152019

(51) Int. Cl.
*H04N 7/18* (2006.01)
*B60R 1/04* (2006.01)
(Continued)

(52) U.S. Cl.
CPC ................. *B60R 1/04* (2013.01); *B60R 1/00* (2013.01); *B60R 1/12* (2013.01); *H04N 5/23216* (2013.01);
(Continued)

(58) Field of Classification Search
CPC ...... H02K 2203/09; H02K 3/522; B60R 1/00; B60R 1/04; B60R 1/12; B60R 2001/1253;
(Continued)

(56) References Cited

U.S. PATENT DOCUMENTS 9,073,482 B2 * 7/2015 Yamamoto ............. H04N 7/185
2005/0046584 A1 * 3/2005 Breed ..................... B60C 11/24
340/13.31
(Continued)

FOREIGN PATENT DOCUMENTS

JP 2009-075988 A 4/2009
JP 2009-117971 A 5/2009
JP 2014-093768 A 5/2014

OTHER PUBLICATIONS

Mody et al, Image signal processing for front camera based automated driver assistance system (Year: 2015).*
(Continued)

*Primary Examiner* — Shan E Elahi
(74) *Attorney, Agent, or Firm* — Oliff PLC

(57) ABSTRACT

A display screen of a display apparatus of an image display system includes a one-way mirror on a front side of the display screen. In an image processing apparatus, an image signal input obtains a captured image signal representing a captured image captured by a camera that captures an image of surroundings of the vehicle; an image generator that generates the display image from the captured image signal; an image output that outputs the display image to the display apparatus to cause the display image to be displayed on the display screen of the display apparatus; and a processor that controls the image generator to cause a partial region of the display image to be a black image so that a portion of the display screen at which the black image is displayed functions as a mirror.

6 Claims, 17 Drawing Sheets

(51) Int. Cl.
*H04N 5/232* (2006.01)
*B60R 1/12* (2006.01)
*B60R 1/00* (2006.01)

(52) U.S. Cl.
CPC ......... *H04N 5/23293* (2013.01); *H04N 7/183* (2013.01); *H04N 7/188* (2013.01); *B60R 2001/1253* (2013.01); *B60R 2300/207* (2013.01); *B60R 2300/70* (2013.01); *B60R 2300/8013* (2013.01)

(58) Field of Classification Search
CPC ......... B60R 2300/207; B60R 2300/70; B60R 2300/8013; H04N 5/23216; H04N 5/23293; H04N 7/183; H04N 7/188
USPC ........................................................ 348/148
See application file for complete search history.

(56) References Cited

U.S. PATENT DOCUMENTS

| | | | |
|---|---|---|---|
| 2010/0201816 A1* | 8/2010 | Lee | B60R 1/12 348/148 |
| 2012/0300075 A1* | 11/2012 | Yamamoto | B60R 1/00 348/148 |
| 2013/0239057 A1* | 9/2013 | Ubillos | G06F 3/04855 715/833 |
| 2013/0307984 A1* | 11/2013 | Pan | B60R 1/12 348/148 |
| 2014/0022390 A1* | 1/2014 | Blank | B60R 1/12 348/148 |
| 2014/0071285 A1* | 3/2014 | Schofield | G06K 9/00818 348/148 |
| 2014/0104095 A1* | 4/2014 | Lynam | B60T 7/22 342/52 |
| 2014/0192253 A1* | 7/2014 | Laroia | G06T 11/60 348/360 |
| 2014/0362221 A1* | 12/2014 | Schofield | G06K 9/00818 348/148 |
| 2015/0051753 A1* | 2/2015 | Kawamata | G01S 7/54 701/1 |
| 2015/0077565 A1* | 3/2015 | Karner | B29C 45/0017 348/148 |
| 2015/0085127 A1* | 3/2015 | Kramer | B60K 35/00 348/148 |
| 2015/0179072 A1* | 6/2015 | Karner | B29C 45/0017 348/148 |
| 2015/0193885 A1* | 7/2015 | Akiva | G06Q 40/08 705/4 |
| 2015/0215588 A1* | 7/2015 | Schofield | G06K 9/00818 348/148 |
| 2015/0251602 A1* | 9/2015 | Baur | B60R 1/00 348/148 |
| 2015/0331595 A1* | 11/2015 | Ubillos | G06F 3/04855 715/833 |

OTHER PUBLICATIONS

Wonneberger et al, Parallel feature extraction and hetrogeneous object detection for multi camera driver assistance systems (Year: 2015).*

* cited by examiner

IMAGE PROCESSING APPARATUS

BACKGROUND OF THE INVENTION

Field of the Invention

The invention relates to a technology for displaying an image showing surroundings of a vehicle.

Description of the Background Art

Generally, a driver of a vehicle, such as a car, sees a surrounding area behind the vehicle by looking at an interior rearview mirror provided in a cabin of the vehicle. However, even if using the interior rearview mirror, there is a case where it is difficult for the driver to see the surrounding area behind the vehicle, for example, because driver's view is blocked by an occupant or luggage in a rear area of the cabin of the vehicle. Moreover, in a case of a truck having a container and the like, there is a case where the interior rearview mirror cannot be used to see the surrounding area behind the vehicle.

Therefore, an image display system has been recently proposed that captures an image of a subject in a surrounding area behind a vehicle, using a camera, and that displays an image including the image of the subject, on a display apparatus provided to a position of an interior rearview mirror in a vehicle. A driver of the vehicle, a user of the image display system, can stably see the surrounding area behind the vehicle without influence by an occupant or luggage in a rear area of a cabin of the vehicle.

However, there is a case where the driver of the vehicle uses a conventional interior rearview mirror to see not only the surrounding area behind the vehicle but also the occupant, luggage, etc. in the rear area of the cabin of the vehicle. The foregoing image display system does not display an image showing the cabin of the vehicle so that it is not possible for the user to see the rear area of the cabin of the vehicle.

Therefore, an image display system including the display apparatus having a display screen using a one-way mirror has been proposed. The image display system causes an inside of the half-silvered mirror to be dark by turning off a backlight of the display apparatus. Thus, the display screen of the display apparatus can be used as a mirror to show an image of the rear area of the cabin in the vehicle.

However, in a case where such an image display system is used, when the backlight is turned off, an entire region of the display screen corresponding to the backlight functions as a mirror on the display apparatus. Therefore, it is impossible to use only a partial region of the display screen of the display apparatus as a mirror. Thus, for example, it is difficult for the user to see both of the surrounding area behind the vehicle and the rear area of the cabin of the vehicle at the same time.

SUMMARY OF THE INVENTION

According to one aspect of the invention, an image processing apparatus generates a display image to be displayed on a display screen of a display apparatus provided in a cabin of a vehicle. The display screen of the display apparatus includes a one-way mirror. The image processing apparatus includes: an image signal input that obtains a captured image signal representing a captured image captured by a camera that captures an image of surroundings of the vehicle; an image generator that generates the display image from the captured image signal; an image output that outputs the display image to the display apparatus to cause the display image to be displayed on the display screen of the display apparatus; and a processor that controls the image generator to cause a partial region of the display image to be a black image so that a portion of the display screen at which the black image is displayed functions as a mirror.

Since the display image showing the black image on the partial region of the display image is displayed on the display screen of the display apparatus, only a partial region of the display screen corresponding to a region of the black image can be used as a mirror to see a situation of the cabin of the vehicle.

According to another aspect of the invention, the image processing apparatus further includes: an operation signal input that receives an operation signal corresponding to an input operation made by a user. The processor controls the image generator to select a region of the display image to be the black image according to the operation signal.

Since the region of the display image to be the black image is selected according to the operation made by the user, the user can select the region of the display screen to be used as the mirror on the display apparatus, as needed.

According to another aspect of the invention, the processor accepts a region specified by a user as a specified region of the display image, and the processor controls the image generator to cause the specified region of the display image to be the black image.

Since the specified region specified by the user is caused to be the black image, the user can use a desired region of the display screen as the mirror on the display apparatus.

Therefore, an object of the invention is to cause only a partial region of a display screen to be used as a mirror.

These and other objects, features, aspects and advantages of the invention will become more apparent from the following detailed description of the invention when taken in conjunction with the accompanying drawings.

DESCRIPTION OF THE EMBODIMENTS

Embodiments of the invention are hereinafter described with reference to the drawings.

<1. First Embodiment>

<1-1. Configuration>

Figure 1:
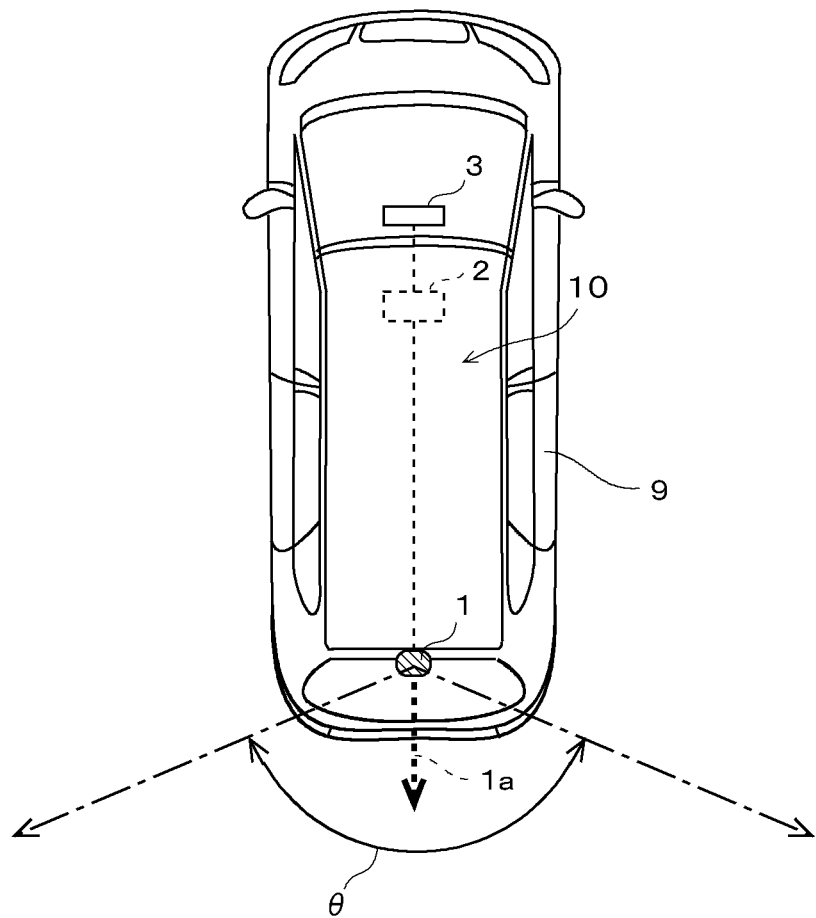
FIG. 1 illustrates an outline of an image display system.

FIG. 1 illustrates an outline of an image display system 10. As shown in FIG. 1, the image display system 10 is mounted on a vehicle (a car in this embodiment) 9. The image display system 10 includes a camera 1 that captures an image of surroundings of the vehicle 9, an image processing apparatus 2 that processes the image and a display apparatus 3 that is provided in a cabin of the vehicle 9. The image display system 10 captures an image of a subject in the surroundings of the vehicle 9, using the camera 1, and has a function of displaying a display image showing the subject on the display apparatus 3 in the cabin of the vehicle.

The camera 1 includes a lens and an image sensor, and electronically captures the captured image including the image of the subject in the surroundings of the vehicle 9. The camera 1 is mounted in an upper portion of a rear end of the vehicle 9, having an optical axis 1a directed to rearward along a front-back direction of the vehicle 9. Therefore, the camera 1 captures the image of the subject existing in a surrounding area behind the vehicle. The lens of the camera 1 is a wide-angle lens and the camera 1 has a relatively wide angle of field θ. Therefore, the camera 1 can capture an image of a relatively wide region of the surrounding area behind the vehicle 9.

Figure 2:
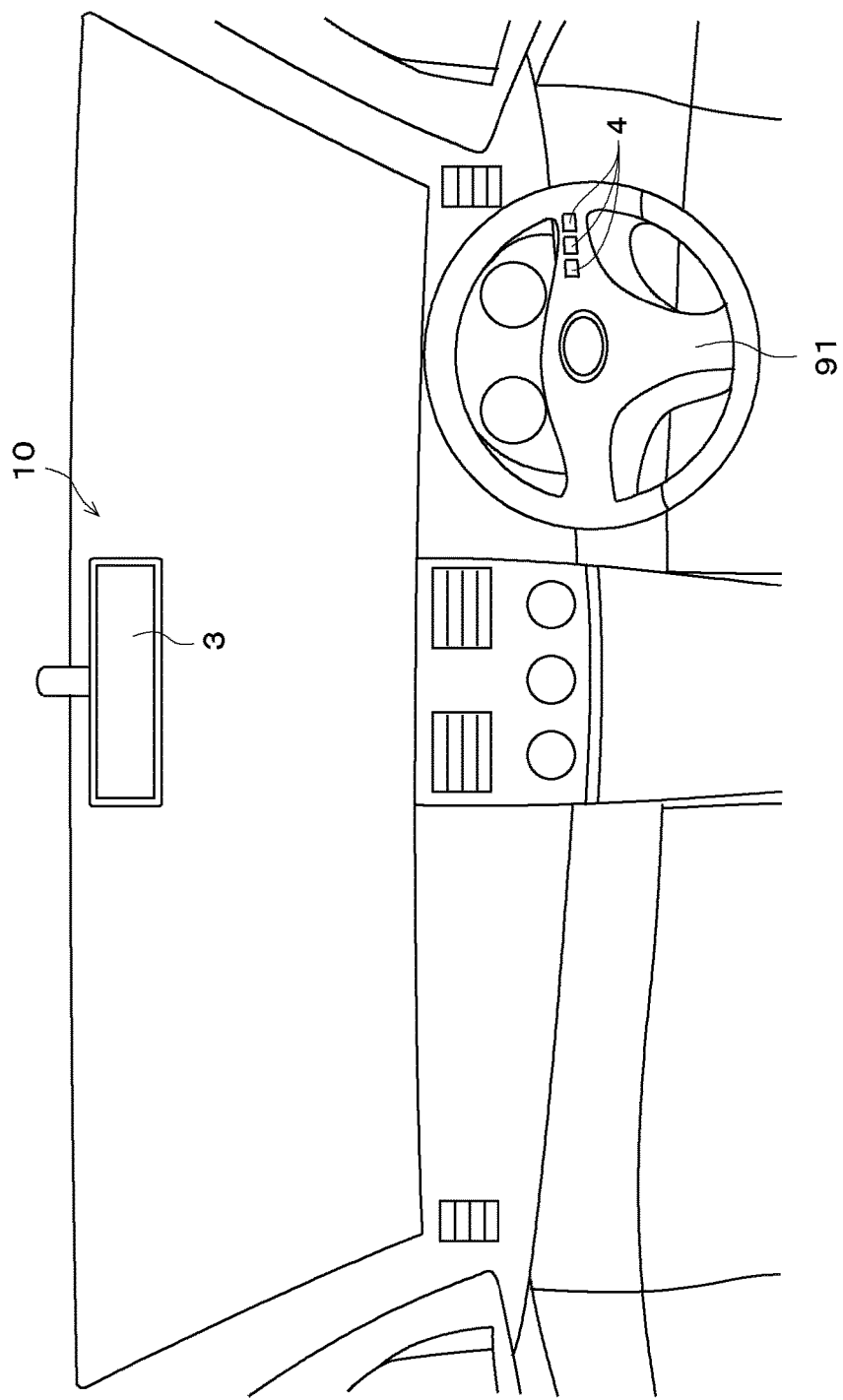
FIG. 2 illustrates a front area of a cabin of a vehicle.

FIG. 2 illustrates a front area of the cabin of the vehicle 9. As shown in FIG. 2, in the vehicle 9 in which the image display system 10 is mounted, the display apparatus 3 is provided, instead of an interior rearview mirror, in a location in which the interior rearview mirror is usually provided in a cabin of a vehicle. The display apparatus 3 displays the display image generated based on the captured image captured by the camera 1 to show the subject in the surrounding area behind the vehicle 9. Therefore, a user (typically a driver of the vehicle 9) of the image display system 10 can see a situation of the surrounding area behind the vehicle 9 by seeing the display image displayed on the display apparatus 3, like looking at the interior rearview mirror.

Moreover, the image display system 10 has a function of causing a partial region of a display screen of the display apparatus 3 to be a mirror that reflects visible light. The user can use the function to see an image of a subject in the cabin of the vehicle 9 on the partial region functioning as the mirror on the display screen. Thus, the user can see a situation of an occupant, luggage, etc. in a rear area of the cabin of the vehicle 9.

The image display system 10 includes a plurality of operation buttons 4 that the user can operate. As shown in FIG. 2, the plurality of operation buttons 4 are provided, for example, on a steering wheel of the vehicle 9. The plurality of operation buttons 4 include three buttons of a left button, a center button and a right button. The user can cause the partial region of the display screen of the display apparatus 3 to function as the mirror by pressing these plurality of operation buttons 4.

Figure 3:
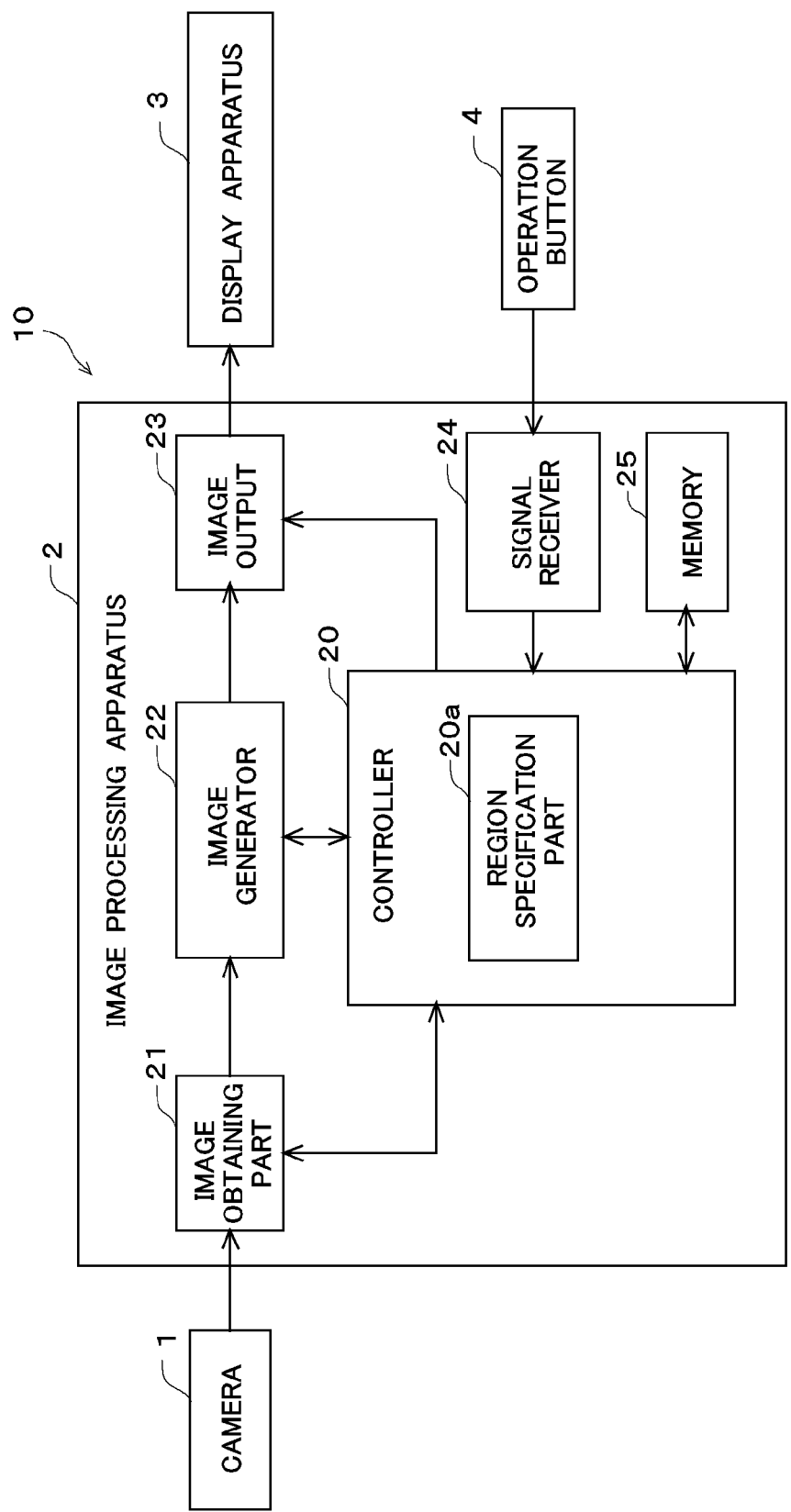
FIG. 3 illustrates a configuration of an image display system in a first embodiment.

FIG. 3 illustrates a block diagram showing a configuration of the image display system 10 in the first embodiment. As shown above, the image display system 10 includes the image processing apparatus 2 that is an electronic apparatus configured to perform various types of image processing.

The camera 1, the display apparatus 3 and the plurality of operation buttons 4 are electrically connected to the image processing apparatus 2. The image processing apparatus 2 performs image processing of the captured image captured by the camera 1 to generate the display image to be displayed on the display screen of the display apparatus 3.

The image processing apparatus 2 includes an image obtaining part 21, an image generator 22 and an image output 23. The image obtaining part 21 obtains the captured image captured by the camera 1. The image obtaining part 21 inputs the obtained captured image into the image generator 22.

The image generator 22 processes the input captured image to generate the display image. The image generator 22 generates the display image showing the image of the subject included in the captured image.

Moreover, the image generator 22 is configured to cause at least a partial region of the display image to be a black image. The term "black image" means an image having pixels included in the image at approx. zero (0) of a brightness value (luminance, brightness, etc.). For example, in a case where values of the pixels are expressed by RGB, the black image is expressed by R≈0, G≈0 and G≈0. Moreover, in a case where the values of the pixels are expressed by YCrCb, the black image is expressed by Y≈0. The image generator 22 is configured to cause the partial region of the display image to be the black image only by simple image processing of changing the values of the pixels. A region of the black image of the display image corresponds to the region functioning as the mirror of the display image displayed on the display apparatus 3 (described later in detail).

The image output 23 outputs the display image generated by the image generator 22, to the display apparatus 3. Thus, the display image is displayed on the display screen of the display apparatus 3.

Moreover, the image processing apparatus 2 further includes a controller 20, a signal receiver 24 and a memory 25. The controller 20 is, for example, a microcomputer, and comprehensively controls the entire image processing apparatus 2.

The signal receiver 24 receives an operation signal corresponding to an operation made by the user, from the plurality of operation buttons 4. In a case where the user operates the plurality of operation buttons 4, each of the plurality of operation buttons 4 sends a predetermined operation signal to the image processing apparatus 2. The signal receiver 24 inputs the received operation signal to the controller 20.

The memory 25 is, for example, a non-volatile memory, such as a flash memory, and stores various types of information. The memory 25 stores a program as firmware and various data used for control by the controller 20.

Moreover, the controller 20 includes a CPU, a RAM, a ROM, etc. Functions of the controller 20 are realized by the CPU performing arithmetic processing according to the programs stored in the memory 25. A region specification part 20a shown in FIG. 3 is a part of the functions realized by the CPU performing the arithmetic processing according to the program.

The region specification part 20a instructs the image generator 22 about a region to be the black image on the display image. The region specification part 20a determines the region to be the black image on the display image, according to the operation signal received by the signal receiver 24 (described later in detail).

<1-2. Display Apparatus Functioning as a Mirror>

Figure 4:
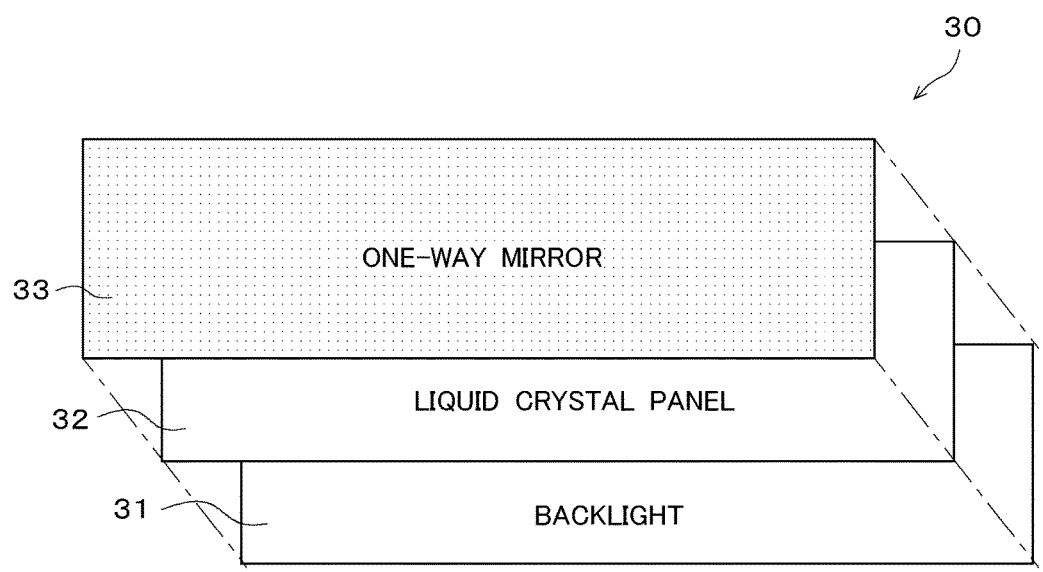
FIG. 4 illustrates a main configuration of a display apparatus.

Next, the display apparatus 3 will be described. FIG. 4 illustrates a main configuration of the display apparatus 3. As shown in FIG. 4, a display screen 30 of the display apparatus 3 includes a backlight 31 and a liquid crystal panel 32. The liquid crystal panel 32 is provided on a front side of the backlight 31. When the display screen 30 displays the display image, the liquid crystal panel 32 lets light of the backlight 31 pass through according to a value of each pixel included in the display image.

Moreover, the display screen 30 further includes a one-way mirror 33 on a front side (side from which the user sees) of the liquid crystal panel 32. The one-way mirror 33 is also called half-silvered mirror or mirror glass and is an apparatus (beam splitter) that has a property of reflecting some incident light and letting other pass through.

When seeing a one-way mirror placed in a boundary between a dark side and a bright side from the bright side, the person sees an image of an object existing on a side of the person (bright side) on the one-way mirror. In other words, the one-way mirror functions as a mirror that reflects visible light. However, when seeing the one-way mirror from the dark side, the person sees an object existing on the other side (bright side) through the one-way mirror.

Due to the property of the one-way mirror 33, the display screen 30 including the one-way mirror 33 on a front side also functions as the mirror showing an image of the object existing in the rear area of the cabin of the vehicle 9. It is recommended that transmittance and reflectance of the one-way mirror 33 used for the display screen 30 should be set, considering visibility of the display screen 30, and the transmittance does not have to be matched to the reflectance.

Figure 5:
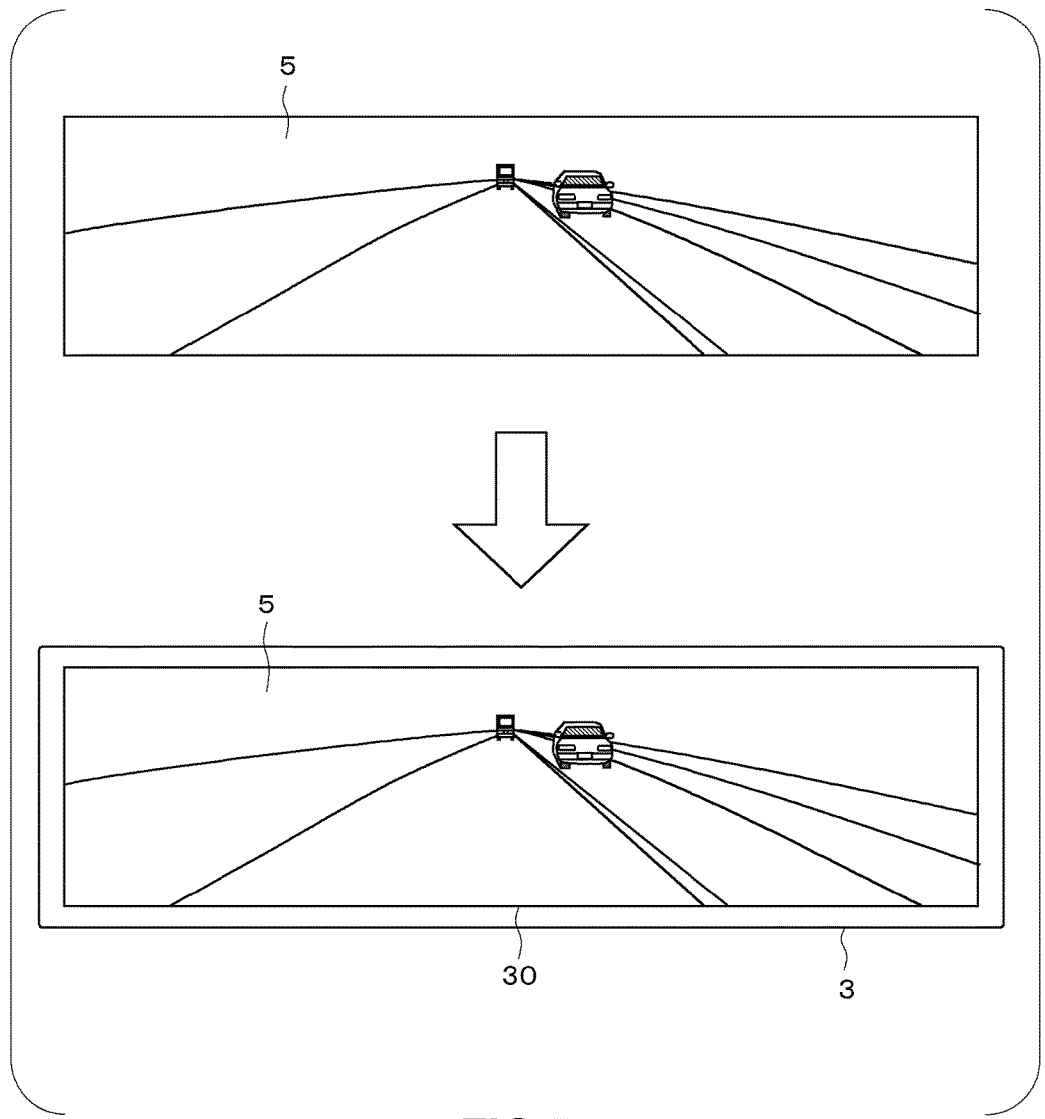
FIG. 5 illustrates an example of a display screen displaying a display image.

As shown in an upper drawing of FIG. 5, in a case where the display apparatus 3 displays a display image 5 showing the image of the subject included in the captured image captured by the camera 1, on an entire region of the display image 5, the subject in the surrounding area behind the vehicle 9 is displayed on the entire region of the display screen 30 of the display apparatus 3, as shown in a lower drawing of FIG. 5. Due to the light of the backlight 31, an inner side of the one-way mirror 33 is bright so that the user sees the image of the subject on the brightly-lit display image 5. Thus, the user can see the situation of the surrounding area behind the vehicle 9.

Figure 6:
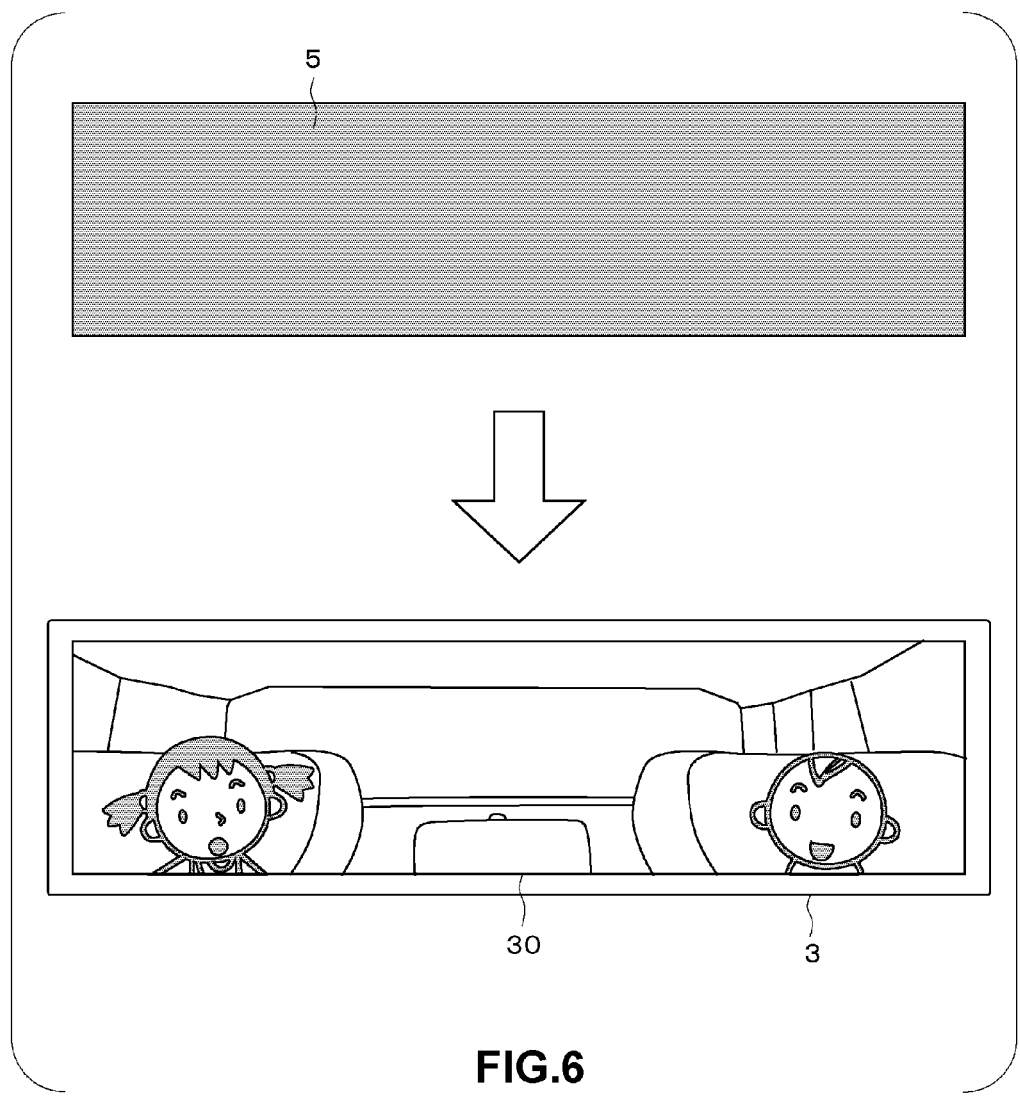
FIG. 6 illustrates an example of a display screen displaying a display image.

On the other hand, as shown in an upper drawing of FIG. 6, in a case where the display apparatus 3 displays the display image 5 showing the black image on the entire region of the display image 5, the entire region of the display screen 30 of the display apparatus 3 functions as a mirror that reflects visible light, as shown in a lower drawing of FIG. 6. Since the inner side of the one-way mirror 33 is dark by displaying the black image that blocks the light of the backlight 31, the user sees an image of a subject on the one-way mirror 33. Thus, the user can see the occupant or the luggage in the rear area of the cabin of the vehicle 9.

Based on such a principle, in the case where the display apparatus 3 displays the display image 5 including the black image, the display screen 30 of the display apparatus 3 functions as the mirror. In a case where the display apparatus 3 displays the display image 5 having the black image on a partial region of the display image 5, only a partial region of the display screen 30 corresponding to a region of the black image functions as the mirror on the display apparatus 3.

Figure 7:
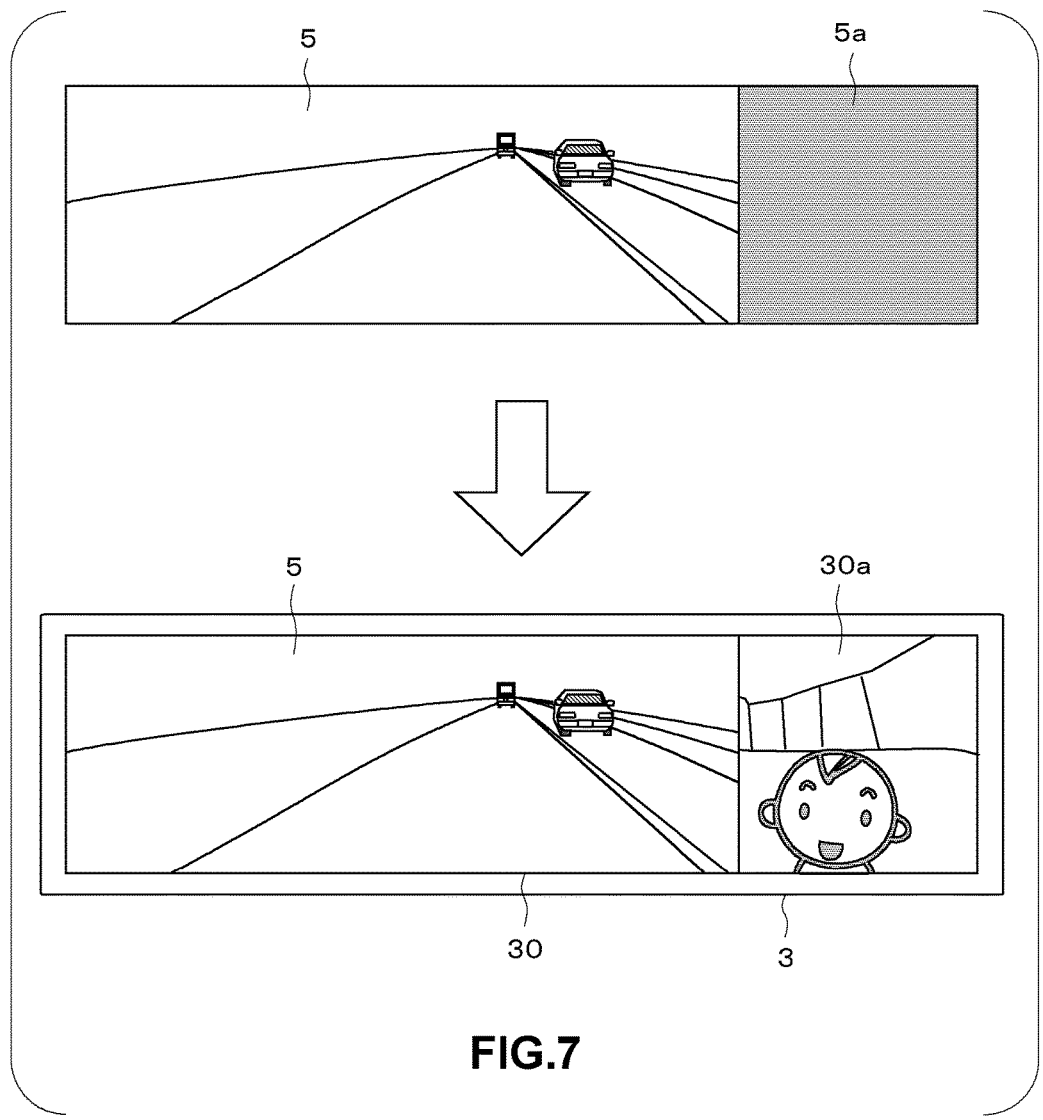
FIG. 7 illustrates an example of a display screen displaying a display image.

For example, as shown in an upper drawing of FIG. 7, in a case where the display apparatus 3 displays the display image 5 showing both the image of the subject included in the captured image on a most region of the display image 5 and the black image only on a right region 5a that is a right portion of the display image 5, only a right side region 30a of the display screen 30 corresponding to the right region 5a that is the black image, functions as the mirror on the display apparatus 3, and an other region shows the subject in the surrounding area behind the vehicle 9, as shown in a lower drawing of FIG. 7. Therefore, in this case, the user can see the surrounding area behind the vehicle 9 and a right rear area of the cabin of the vehicle 9, at the same time.

Figure 8:
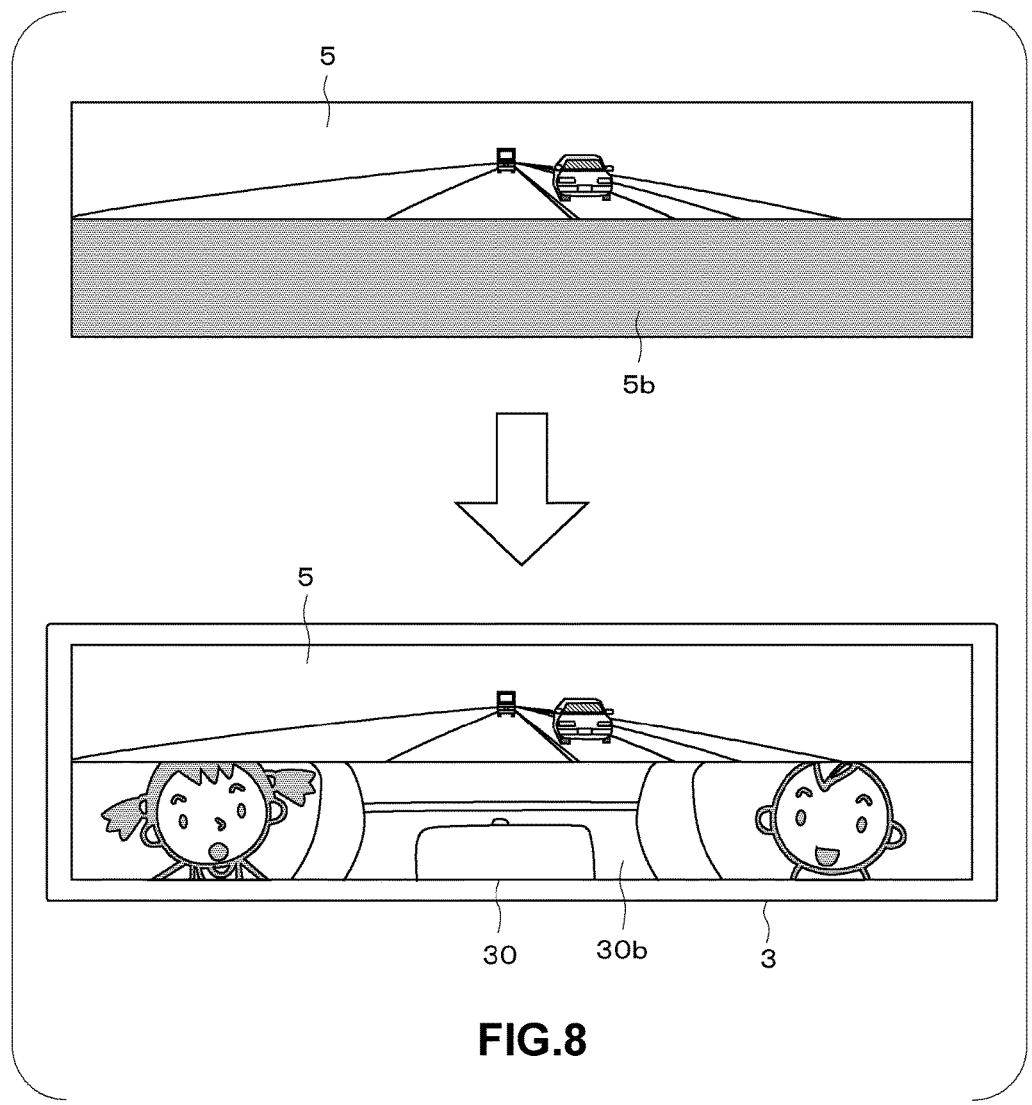
FIG. 8 illustrates an example of a display screen displaying a display image.

Moreover, as shown in an upper drawing of FIG. 8, in a case where the display apparatus 3 displays the display image 5 showing both the image of the subject included in the captured image on an upper half of the display image 5 and the black image on a lower region 5b that is a lower half of the display image 5, only a lower region 30b of the display screen 30 corresponding to the lower region 5b that is the black image, functions as the mirror on the display apparatus 3, and an other region shows the subject in the surrounding area behind the vehicle 9, as shown in a lower drawing of FIG. 8. Therefore, in this case, the user can see the situation of the surrounding area behind the vehicle 9 and a lower rear area of the cabin of the vehicle 9, at the same time.

Figure 9:
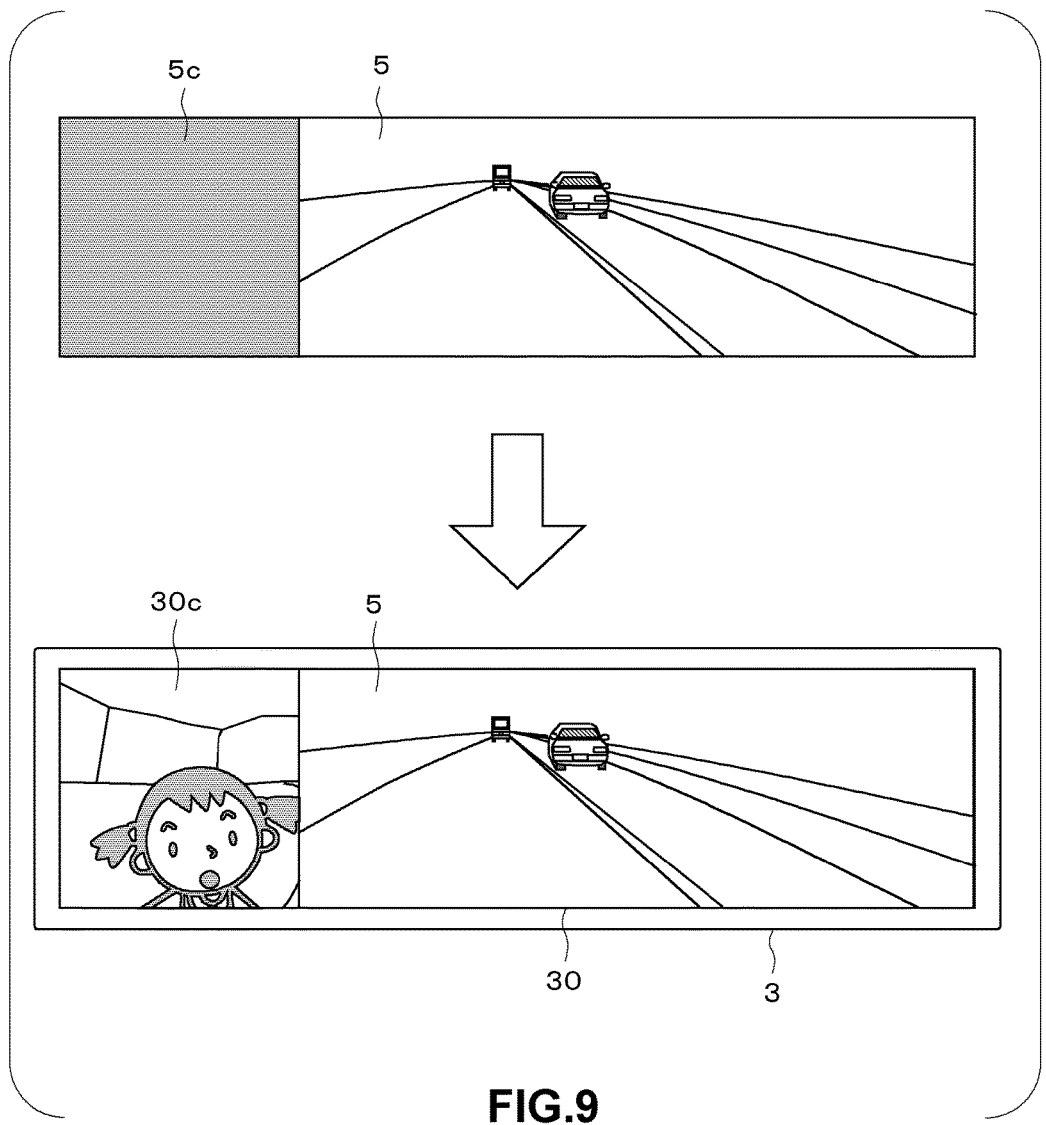
FIG. 9 illustrates an example of a display screen displaying a display image.

Moreover, as shown in an upper drawing of FIG. 9, in a case where the display apparatus 3 displays the display image 5 showing both the image of the subject included in the captured image on a most region of the display image 5 and the black image only on a left region 5c that is a left portion of the display image 5, only a left side region 30c of the display screen 30 corresponding to the left region 5c that is the black image, functions as the mirror on the display apparatus 3, and an other region shows the subject in the surrounding area behind the vehicle 9, as shown in a lower drawing of FIG. 9. Therefore, in this case, the user can see the surrounding area behind the vehicle 9 and a left rear area of the cabin of the vehicle 9, at the same time.

As described above, the region of the black image of the display image 5 corresponds to the region functioning as the mirror on the display screen 30 of the display apparatus 3. The region specification part 20a of the image processing apparatus 2 determines the region of the display image 5 to be the black image. The region specification part 20a determines the region of the display image 5 to be the black image, according to the operation signal sent from the plurality of operation buttons 4 including the left, center and right buttons.

When the right button is pressed, as shown in FIG. 7, the region specification part 20a determines the right region 5a of the display image 5 as the region to be the black image. When the center button is pressed, as shown in FIG. 8, the region specification part 20a determines the lower region 5b of the display image 5 as the region to be the black image. Moreover, when the left button is pressed, as shown in FIG. 9, the region specification part 20a determines the left region 5c of the display image 5 as the region to be the black image. As described above, a position of the region of the display image 5 to be the black image and a correspondence relationship between the region to be the black image and each of the plurality of operation buttons 4 are determined beforehand and are stored in the memory 25 and the like.

The region specification part 20a instructs the image generator 22 about the determined region to be the black image. The image generator 22 causes a partial region of the display image 5 to be the black image according to an instruction from the region specification part 20a. Thus, the image generator 22 changes the region of the display image 5 to the black image according to the pressed button 4.

Therefore, the user can freely select the region to be used as the mirror on the display screen 30 of the display apparatus 3 by pressing the plurality of operation buttons 4.

<1-3. Process of Image Processing Apparatus>

Figure 10:
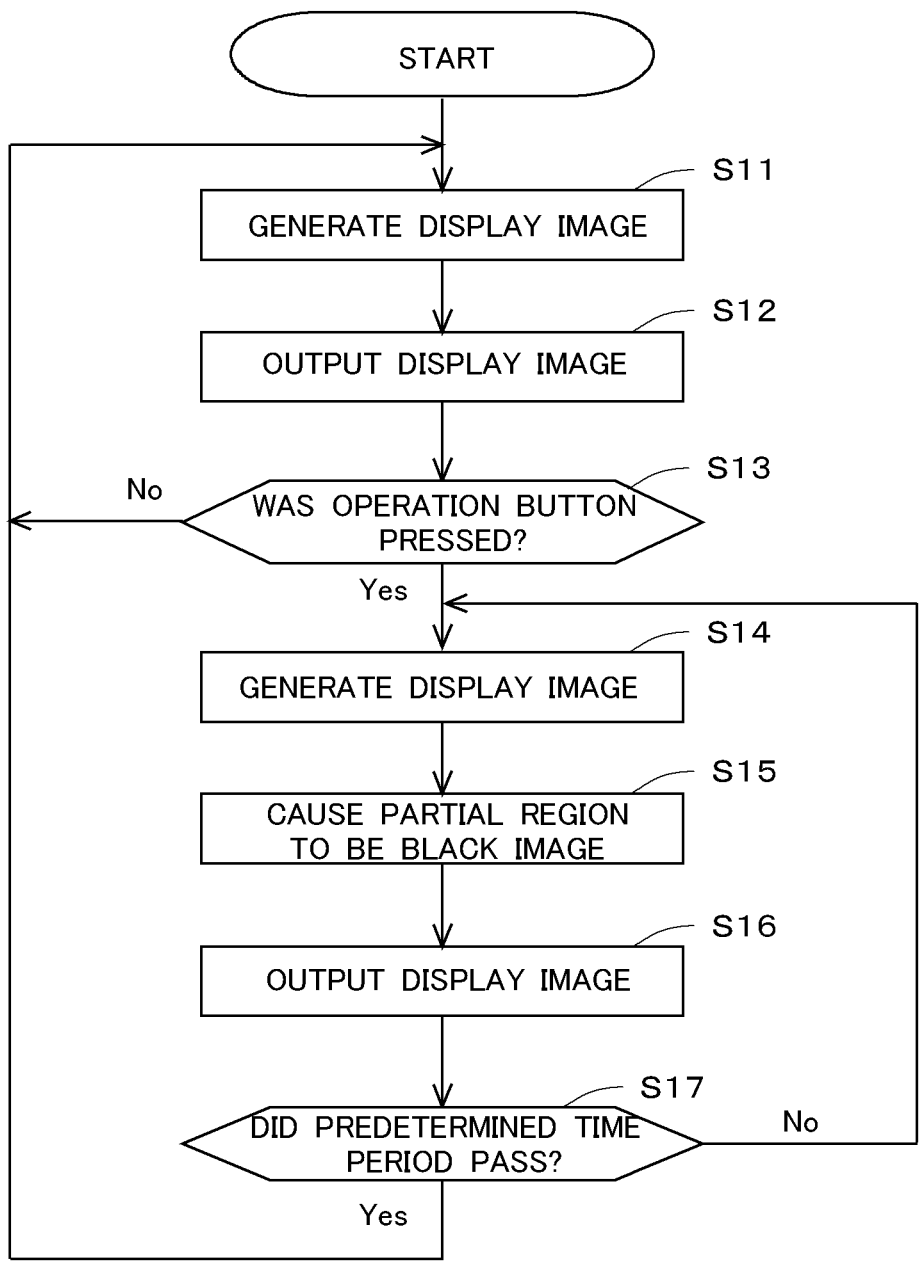
FIG. 10 illustrates a process flow of an image processing apparatus in the first embodiment.

Next described is a process flow of the image processing apparatus 2. FIG. 10 illustrates the process flow of the image processing apparatus 2.

In a normal state, the image processing apparatus 2 generates the display image 5 showing the image of the subject included in the captured image on the entire region of the display image 5 and then displays the generated display image 5 on the display apparatus 3.

First, the image obtaining part 21 obtains the captured image from the camera 1. The captured image includes the image of the subject in the surrounding area behind the vehicle 9. The image generator 22 generates the display image 5 showing the subject included in the captured image on the entire region of the display image 5, using the captured image (a step S11).

Next, the image output 23 outputs the display image 5 generated by the image generator 22 to the display apparatus 3 (a step S12). Thus, the display image 5 is displayed on the display apparatus 3. As a result, the subject in the surrounding area behind the vehicle 9 is displayed on the entire region of the display screen 30 of the display apparatus 3 (refer to FIG. 5).

The process (the steps S11 and S12) is repeated in a predetermined cycle (e.g. 1/30 sec. cycle) in the normal state until the user presses one of the plurality of operation buttons 4 (No in a step S13). Thus, the user can see the situation of the surrounding area behind the vehicle 9 on a substantially real-time basis.

Moreover, in a case where the user presses one of the plurality of operation buttons 4 (Yes in the step S13), the image processing apparatus 2 generates the display image 5 showing the black image on the partial region of the display image 5 and causes the display image 5 to be displayed on the display apparatus 3.

First, the image generator 22 generates the display image 5 showing the subject included in the captured image on the entire region of the display image 5, using the captured image by the camera 1 obtained by the image obtaining part 21 (a step S14).

Next, the image generator 22 causes the partial region of the generated display image 5 to be the black image, according to the instruction from the region specification part 20a (a step S15). As described above, the region specification part 20a determines the region of the display image 5 corresponding to the pressed one of the plurality of operation buttons 4 as the region to be the black image, and then instructs the image generator 22 about the determined region. Then, the image generator 22 causes the region of the display image 5 instructed by the region specification part 20a to be the black image. At the same time, the image generator 22 may adjust a size of the image of the subject on the captured image such that the image of the subject is included in a region other than the black image of the display image 5.

Next, the image output 23 outputs the display image 5 generated by the image generator 22, to the display apparatus 3 (a step S16). Thus, the display image 5 including the region of the black image is displayed on the display apparatus 3. Accordingly, the partial region of the display screen 30 corresponding to the region of the black image functions as the mirror on the display apparatus 3 (refer to FIGS. 7-9).

The process (the steps S14-S16) is repeated in a predetermined cycle (e.g. 1/30 sec. cycle) until a predetermined time period (e.g. 30 sec.) passes after the user operates one of the plurality of operation buttons 4 (No in a step S17). Thus, while seeing the situation of the surrounding area behind the vehicle 9, the user can see the rear area of the cabin of the vehicle 9. Moreover, in a case where the user freshly presses another of the plurality of operation buttons 4 before the predetermined time period passes, the image generator 22 selects the region of the display image 5 to be the black image, corresponding to the freshly pressed button 4.

Once the predetermined time period passes after the user pressed the operation button 4 (Yes in the step S17), the process moves back to the step S11. Thus, the image processing apparatus 2 returns to the normal state.

As described above, the display screen 30 of the display apparatus 3 of the image display system 10 in the first embodiment includes the one-way mirror 33 on the front side. The image obtaining part 21 of the image processing apparatus 2 obtains the captured image by the camera 1 that captures the image of the surroundings of the vehicle 9. The image generator 22 generates the display image 5, using the captured image, and the image output 23 outputs the display image 5 to the display apparatus 3 to cause the display image 5 to be displayed on the display screen 30. Then, the image generator 22 changes the partial region of the display image 5 to the black image.

Thus, the display image 5 showing the black image on the partial region of the display image 5 is displayed on the display screen 30 of the display apparatus 3. Therefore, the partial region corresponding to the black region can be used as a mirror on the display screen 30 to see a situation of the cabin of the vehicle 9. As a result, the user can see both situations of the surrounding area behind the vehicle 9 and the rear area of the cabin of the vehicle 9, at the same time.

Moreover, the signal receiver 24 receives the operation signal corresponding to the operation made by the user, and then the image generator 22 selects the region of the display image 5 to be the black image according to the operation signal. Therefore, the user can select the region to be used as the mirror on the display screen 30 of the display apparatus 3, as needed.

<2. Second Embodiment>

Next, a second embodiment will be described. A configuration and a process of an image display system 10 in the second embodiment are substantially the same as the configuration and the process of the image display system 10 in the first embodiment. Therefore, a difference from the image display system 10 in the first embodiment will be mainly described below. In the first embodiment, the region of the display image 5 to be the black image is predetermined. On the other hand, in the second embodiment, a user can specify a region of a display image 5 to be a black image.

Figure 11:
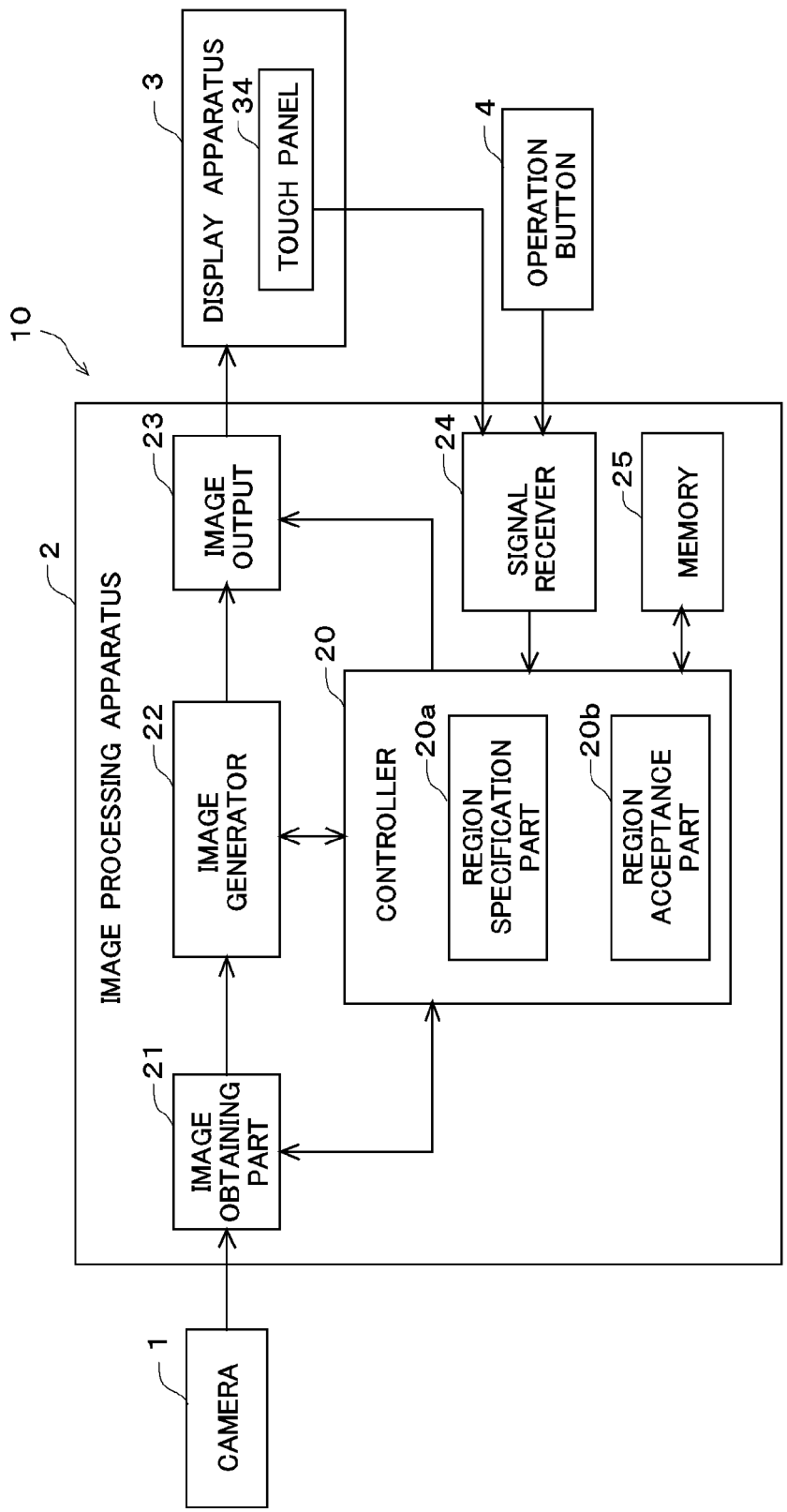
FIG. 11 illustrates a block diagram showing a configuration of an image display system in a second embodiment.

FIG. 11 illustrates a block diagram showing the configuration of the image display system 10 in the second embodiment. In the second embodiment, a display apparatus 3 includes a touch panel 34 that receives a touch operation made by the user, on a display screen 30. Therefore, the user can make the touch operation with the display screen 30 (the touch panel 34) of the display apparatus 3. A signal receiver 24 of an image processing apparatus 2 receives an operation signal indicative of the touch operation received by the touch panel 34.

Moreover, the image processing apparatus 2 further includes a region acceptance part 20b as a function that is realized by a CPU of a controller 20 performing arithmetic processing according to a program.

The region acceptance part 20b accepts a region of the display image 5 specified by the user as a specified region. The region acceptance part 20b accepts the specified region according to the operation signal corresponding to the touch operation made by the user with the touch panel 34. The specified region accepted by the region acceptance part 20b is set to be a region to be the black image (i.e. a region functioning as a mirror on the display screen 30) of the display image 5.

In a case where the image display system 10 is on a setting mode other than a normal mode, the region acceptance part 20b accepts the specified region. The image display system 10 moves to the setting mode when the user makes a predetermined touch operation while a vehicle 9 is being stopped.

Figure 12:
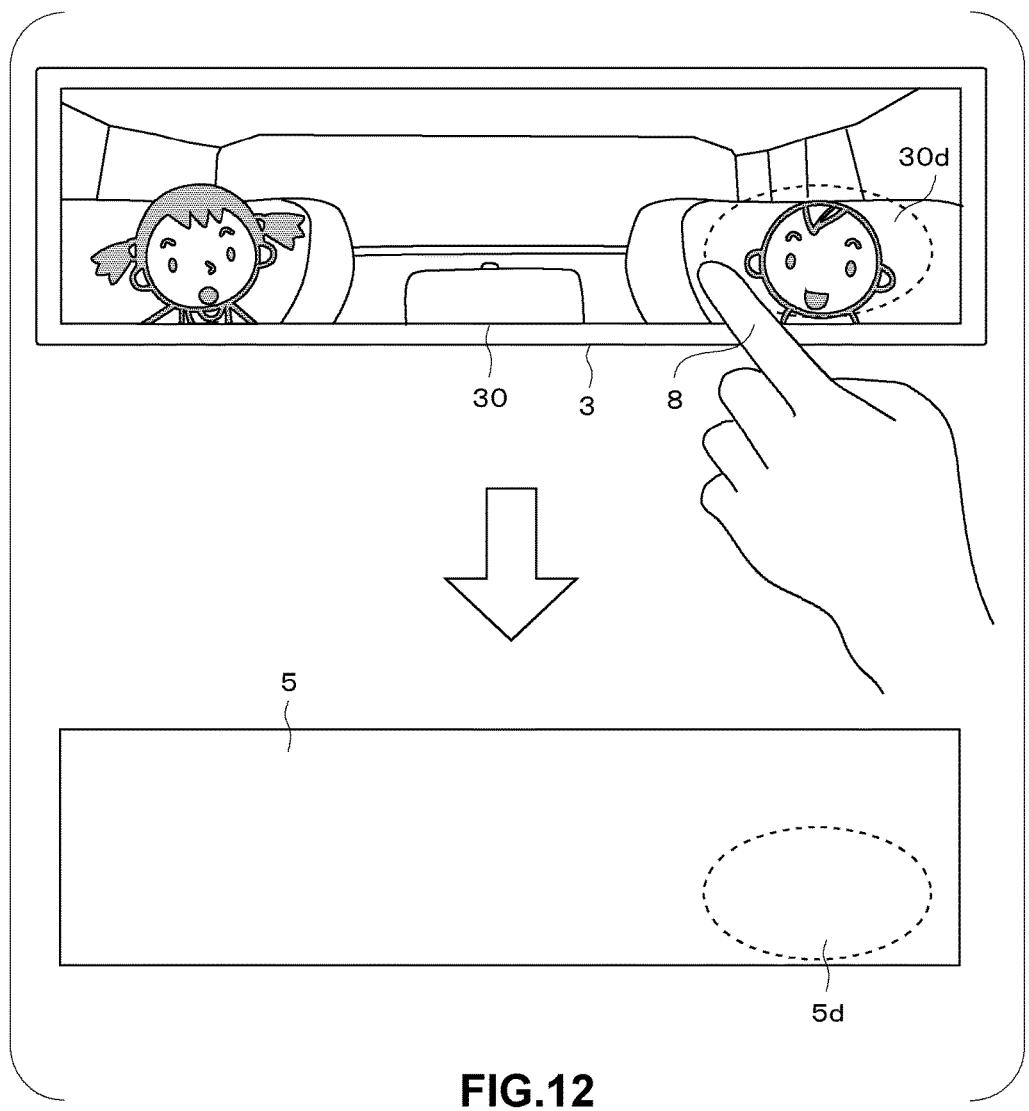
FIG. 12 illustrates acceptance of a specified region.

FIG. 12 illustrates the specified region accepted by the region acceptance part 20b. In the setting mode, the display image showing the black image on an entire region of the display image is displayed on the display screen 30 of the display apparatus 3. Thus, as shown in an upper drawing of FIG. 12, the entire region of the display screen 30 of the display apparatus 3 functions as the mirror showing an image of a rear area of a cabin of the vehicle 9.

The user can select a region 30d to be the mirror from the entire region of the display screen 30 in the normal mode. The user specifies the region 30d to be the mirror by, for example, circling a region with a finger 8 or the like. While seeing the image of the rear area of the cabin of the vehicle 9, the user can specify a region showing an image of a desired object (a person, luggage, etc.) as the region 30d to be the mirror. A shape of the region 30d specified by the user is not limited to a rectangle, but the shape can be an ellipse, a triangle or another shape that the user desires.

As shown in a lower drawing of FIG. 12, the region acceptance part 20b accepts a region of the display image 5 corresponding to the region 30d specified by the user on the display screen 30, as a specified region 5d, according to the operation signal corresponding to the touch operation made by the user. Therefore, virtually, the user can specify a desired region of the display image 5 as the specified region 5d. The region acceptance part 20b stores a position of the accepted specified region 5d in a memory 25.

In a case where the image display system 10 is in the normal mode, when the user presses one of a plurality of operation buttons 4 (Yes in the step S13 in FIG. 10), the image processing apparatus 2 generates the display image 5 showing the black image on the specified region 5d and then displays the generated display image 5 on the display apparatus 3.

Figure 13:
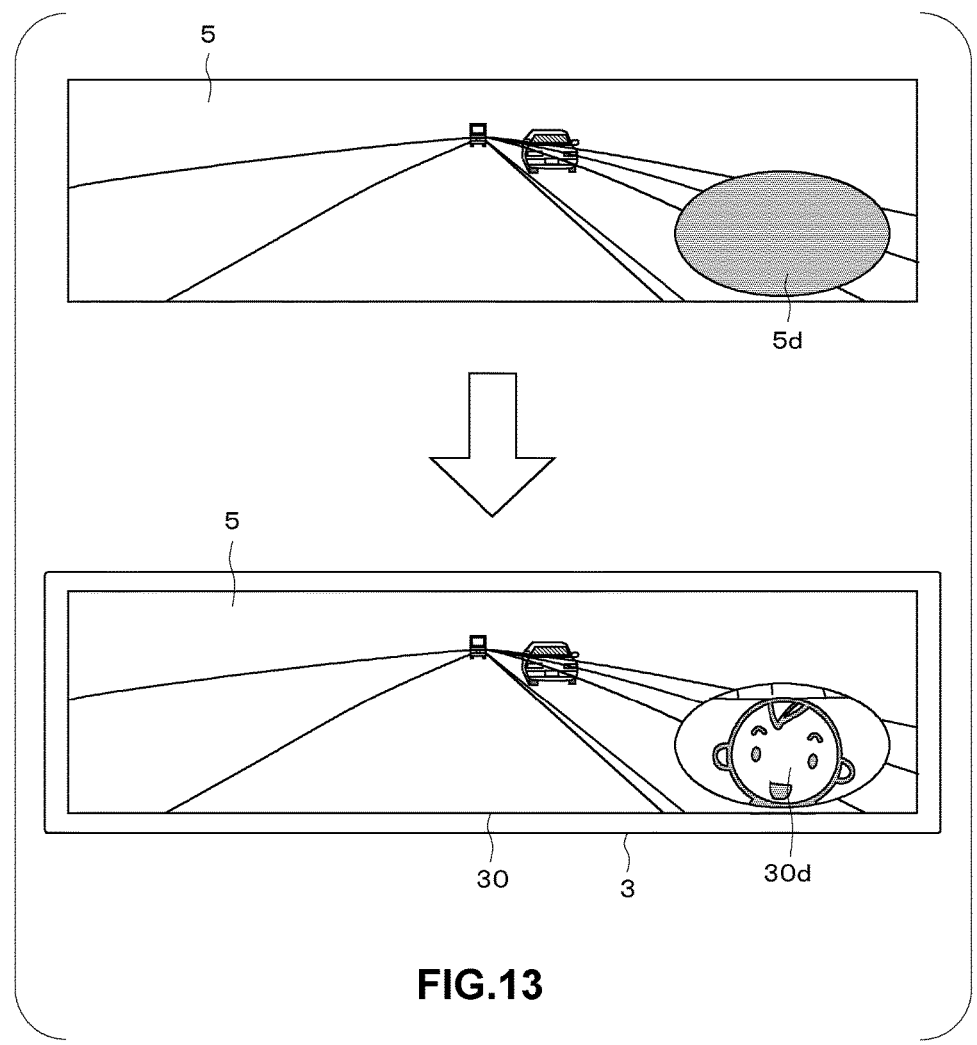
FIG. 13 illustrates an example of a display screen displaying a display image.

First, an image generator 22 generates the display image 5 showing a subject included in a captured image on the entire region of the display image 5, using the captured image by the camera 1 obtained by an image obtaining part 21 (the step S14). Next, a region specification part 20a reads out the position of the specified region 5d from the memory 25 and determines the specified region 5d of the display image 5 as a region to be the black image. The region specification part 20a instructs the image generator 22 about the determined region. Thus, as shown in an upper drawing of FIG. 13, the image generator 22 causes only the specified region 5d of the display image 5 to be the black image (the step S15). Then, the image output 23 outputs the display image 5 generated by the image generator 22, to the display apparatus 3 (the step S16).

As a result, the display image 5 showing the black image on the specified region 5d is displayed on the display apparatus 3. As shown in a lower drawing of FIG. 13, the region 30d corresponding to the specified region 5d that is the black image functions as the mirror on the display screen 30 of the display apparatus 3. In other words, only the region 30d specified by the user functions as the mirror on the display screen 30. Thus, while seeing the surrounding area behind the vehicle 9, the user can see the desired object in the rear area of the cabin of the vehicle 9.

As described above, the region acceptance part 20b of the image display system 10 in the second embodiment accepts the region specified by the user, of the display image 5, as the specified region 5d, and then the image generator 22 causes the specified region 5d of the display image 5 to be the black region. Therefore, the user can use the desired region as the mirror on the display screen 30 of the display apparatus 3.

Moreover, the region acceptance part 20b may be configured to accept a plurality of regions specified by the user, of the display image 5, as the specified regions. In this case, the region acceptance part 20b associates positions of the plurality of specified regions specified by the user with the plurality of operation buttons 4 to store association between the positions of the plurality of specified regions and the plurality of operation buttons 4 in the memory 25. Then, when the user presses one of the plurality of operation buttons 4, the image generator 22 generates the display image 5 showing the black image on the specified region corresponding to the one of the plurality of operation buttons 4 pressed by the user.

<3. Third Embodiment>

Next, a third embodiment will be described. A configuration and a process of an image display system 10 in the third embodiment are substantially the same as the configuration and the process of the image display system 10 in the first embodiment. Therefore, a difference from the image display system 10 in the first embodiment will be mainly described below. In the first embodiment, in the case where the user presses one of the plurality of operation buttons 4, a partial region of the display screen 30 functions as the mirror on the display apparatus 3. On the other hand, in the third embodiment, in a case where a sound occurs in a cabin of a vehicle 9, a partial region of a display screen 30 functions as a mirror on the display apparatus 3.

Figure 14:
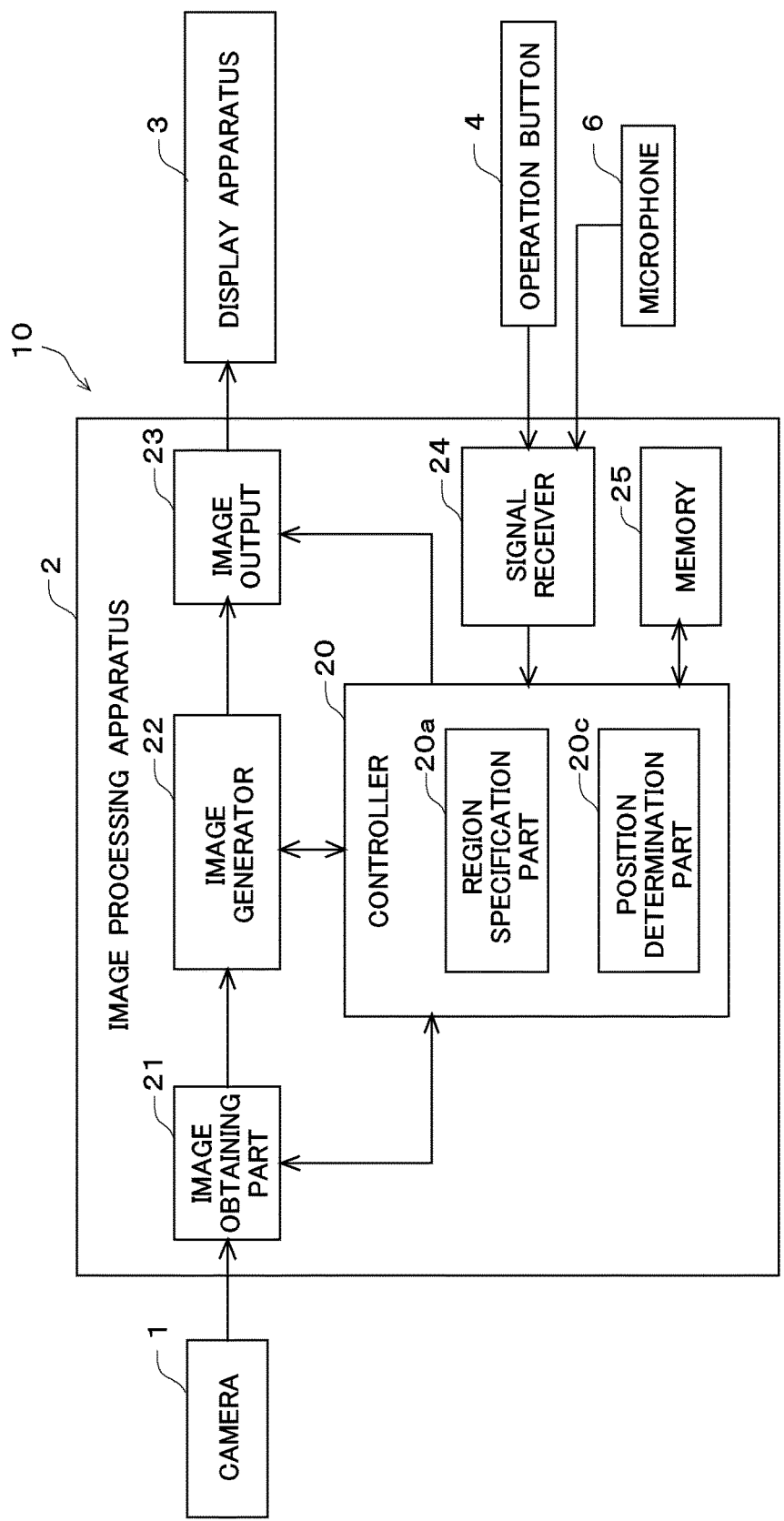
FIG. 14 illustrates a block diagram showing a configuration of an image display system in a third embodiment.

FIG. 14 illustrates a block diagram showing the configuration of the image display system 10 in the third embodiment. The image display system 10 in the third embodiment includes a microphone 6 for receiving the sound that occurs in the cabin of the vehicle 9. The microphone 6 generates an audio signal that is an electric signal corresponding to the received sound. A signal receiver 24 of an image processing apparatus 2 detects the sound that occurred in the cabin of the vehicle 9, by receiving the audio signal from the microphone 6.

Moreover, the image processing apparatus 2 further includes a position determination part 20c as a function realized by a CPU of a controller 20 performing arithmetic processing according to a program. In a case where a sound occurred in the cabin of the vehicle 9, the position determination part 20c determines a sound occurrence position in which the sound occurred. The position determination part 20c determines the sound occurrence position based on a strength of the audio signal from the microphone 6.

Figure 15:
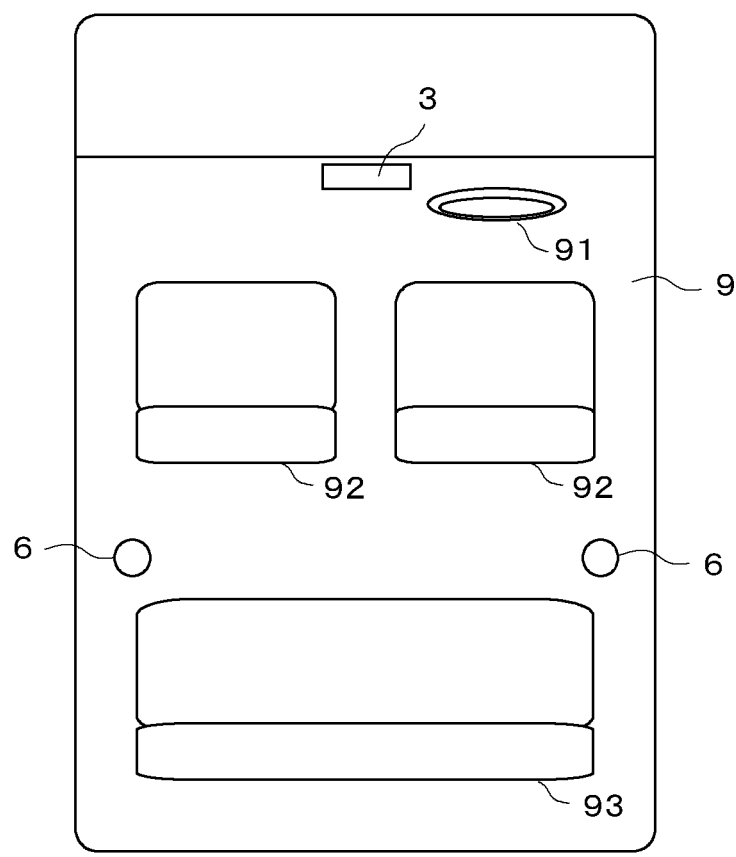
FIG. 15 is a schematic depiction of a cabin of a vehicle

FIG. 15 is a schematic depiction of the cabin of the vehicle 9. Two front seats 92 are provided in a front area and a rear seat 91 extending in a horizontal direction is provided in a rear area of the cabin of the vehicle 9. As shown in FIG. 15, the microphone 6 is provided on each of a left side and a right side of the rear seat 91.

The position determination part 20c compares the strengths of the audio signals from the two microphones 6 on the left and right sides of the rear seat 91 to determine the sound occurrence position. The position determination part 20c determines one of the left side, a center side and the right side of the rear seat 91 as the sound occurrence position.

A region specification part 20a in the third embodiment determines the region of a display image 5 corresponding to the sound occurrence position as a region to be a black image. In a case where the right side of the rear seat 91 is the sound occurrence position, the region specification part 20a determines a right region 5a of the display image 5 as a region to be the black image (refer to FIG. 7). In a case where the center side of the rear seat 91 is the sound occurrence position, the region specification part 20a determines a lower region 5b of the display image 5 as the region to be the black image (refer to FIG. 8). In a case where the left side of the rear seat 91 is the sound occurrence position, the region specification part 20a determines a left region 5c of the display image 5 as the region to be the black image (refer to FIG. 9).

An image generator 22 causes the region of the display image 5 determined by the region specification part 20a to be the black image. Therefore, the image generator 22 causes the region corresponding to the sound occurrence position of the display image 5, to be the black image. Since the display image 5 is displayed on the display apparatus 3, the user can use the region showing an image of the sound occurrence position as the mirror on the display screen 30 of the display apparatus 3 so that the user can see a situation of the sound occurrence position.

Figure 16:
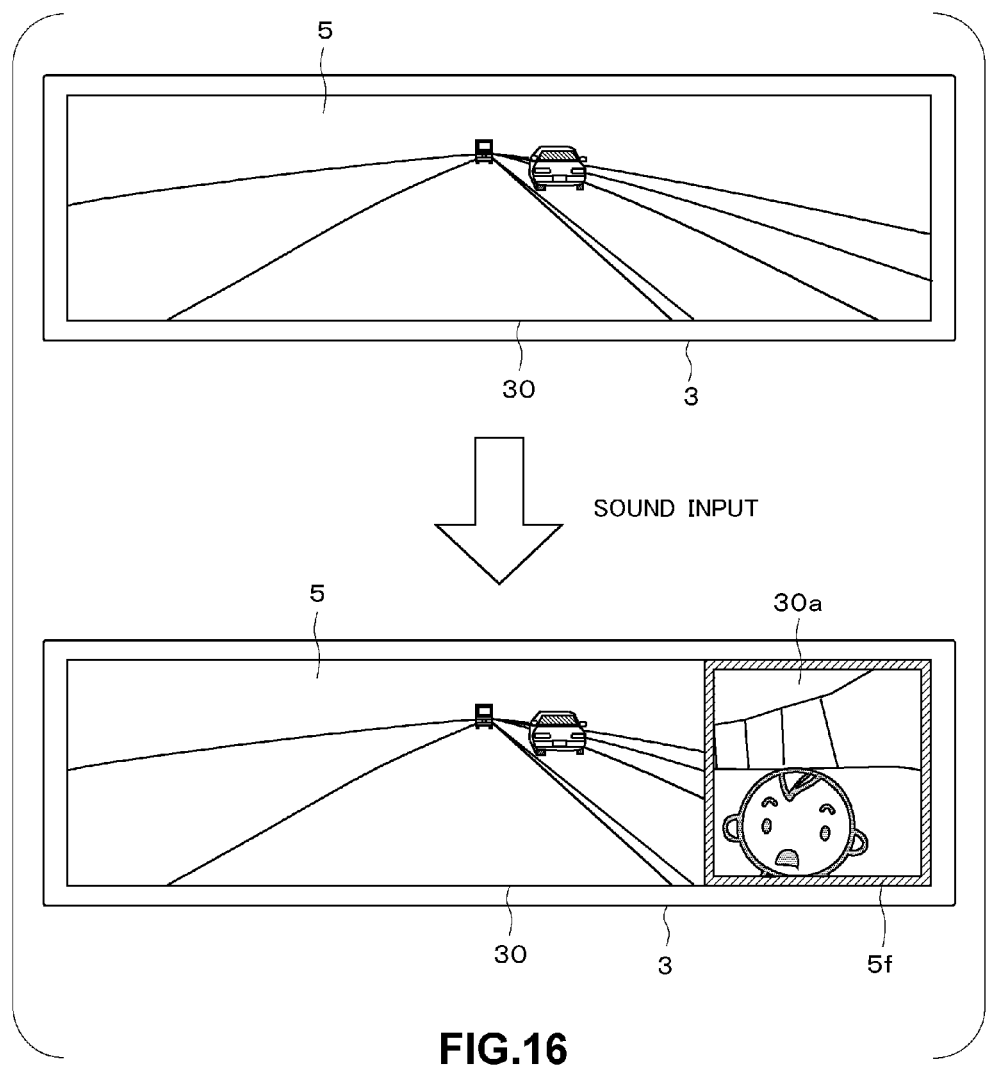
FIG. 16 illustrates an example of a display screen displaying a display image.

For example, as shown in an upper drawing of FIG. 16, while an entire region of the display screen 30 of the display apparatus 3 is showing a subject in a surrounding area behind the vehicle 9, in a case where a child in the right side of the rear seat 91 begins crying, the position determination part 20c determines the right side of the rear seat 91 as an occurrence position for a cry of the child, based on the audio signals from the two microphones 6. Then, the image generator 22 causes the right region 5a of the display image 5 corresponding to the determined sound occurrence position, to be the black image, and an image output 23 outputs the display image 5 to the display apparatus 3.

Thus, as shown in a lower drawing of FIG. 16, the right side region 30a showing an image of the occurrence position of the cry of the child functions as the mirror on the display screen 30 of the display apparatus 3. Therefore, while seeing a situation of the surrounding area behind the vehicle 9, the user can see a situation of the child crying. At the time, the image generator 22 may generate a frame 5f in a predetermined color around a region of the display image 5 to be the black image. Thus, the region functioning as the mirror can be highlighted on the display screen 30. Moreover, such a frame 5f may be blinked.

Figure 17:
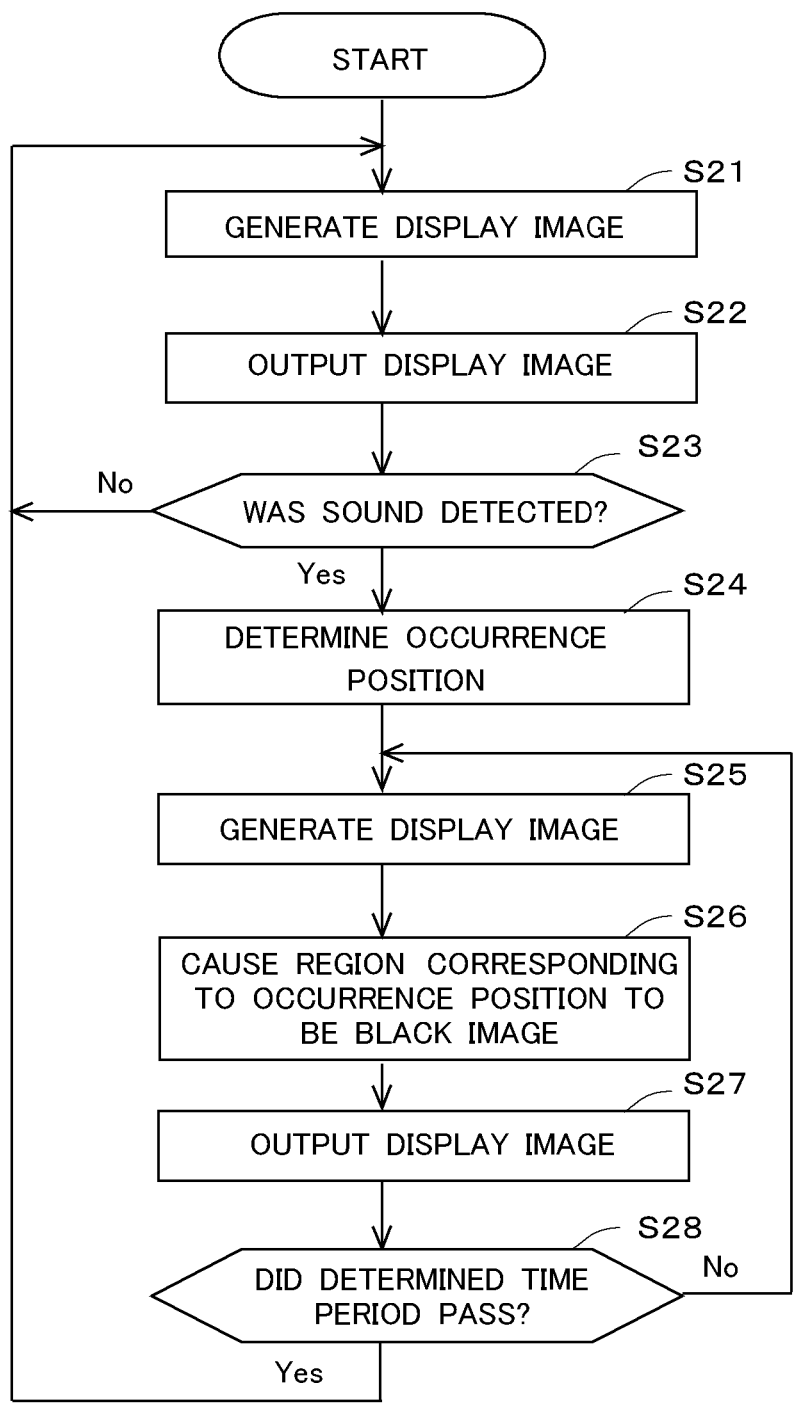
FIG. 17 illustrates a process flow of an image processing apparatus in a third embodiment.

FIG. 17 illustrates a process flow of the image processing apparatus 2 in the third embodiment. The image processing apparatus 2 generates the display image 5 showing the image of the subject included in a captured image on the entire region of the display image 5 in a normal state in the third embodiment, and then displays the generated display image 5 on the display apparatus 3 (steps S21 and S22). The process of steps S21 and S22 is the same as the process of the steps S11 and S12 in the first embodiment. Such a process in the normal state is repeated in a predetermined cycle until the signal receiver 24 detects a sound in the cabin of the vehicle 9 (No in a step S23).

In a case where the signal receiver 24 detected the sound in the cabin of the vehicle 9 (Yes in the step S23), the image processing apparatus 2 generates the display image 5 showing the black image on the region corresponding to the sound occurrence position, and then causes the generated display image 5 to be displayed on the display apparatus 3.

First, the position determination part 20c determines the sound occurrence position based on the audio signals from the two microphones 6 on the left and right sides of the rear seat 91 (a step S24).

Next, the image generator 22 generates the display image 5 showing the subject in the captured image on the entire region of the display image 5, using the captured image by the camera 1 obtained by an image obtaining part 21 (a step S25). Next, the region specification part 20a determines the region of the display image 5 corresponding to the sound occurrence position as the black image, and then instructs the image generator 22 about the determined region. The image generator 22 causes the region of the display image 5 instructed by the region specification part 20a to be the black image (a step S26).

Next, the image output 23 outputs the display image 5 generated by the image generator 22 to the display apparatus 3 (a step S27). Thus, the display image 5 showing the black image on the region corresponding to the sound occurrence position is displayed on the display apparatus 3. Accordingly, the region of the display screen 30 corresponding to the sound occurrence position functions as the mirror on the display apparatus 3.

Such a process (steps S25-S27) is repeated in a predetermined cycle until a predetermined time period (e.g. one minute) passes after the signal receiver 24 detects the sound in the cabin of the vehicle 9 (No in a step S28). Once the predetermined time period passes (Yes in the step S28), the step moves back to the step S21.

As described above, the signal receiver 24 of the image display system 10 in the third embodiment detects a sound that occurred in the cabin of the vehicle 9 and the position determination part 20c determines the sound occurrence position. Then, in the case where the signal receiver 24 detects the sound, the image generator 22 causes the region of the display image 5 corresponding to the sound occurrence position, to be the black image. Thus, the user can see the situation in the sound occurrence position in the cabin of the vehicle 9.

In addition to the case where the sound occurs in the cabin of the vehicle 9, in a case where the user presses one of the plurality of operation buttons 4, a partial region of the display screen 30 of the display apparatus 3 may function as mirror on the image display system 10 in the third embodiment.

<4. Modifications>

The embodiments of the invention are described above. However, the invention is not limited to the foregoing embodiments, but various modifications are possible. Examples of those modifications will be described below. Any form of the embodiments described above and the modifications described below may be arbitrarily combined with one another.

In the foregoing first embodiment, the plurality of operation buttons 4 are provided on the steering wheel. But the plurality of operation buttons 4 are provided in a vicinity of the display screen 30 of the display apparatus 3.

In the foregoing first embodiment, in the case where the user presses one of the plurality of operation buttons 4, a partial region of the display screen 30 functions as the mirror on the display apparatus 3. On the other hand, in a case where the display apparatus 3 includes a touch panel, when the user makes a touch operation with the touch panel, a partial region of the display screen 30 of the display apparatus 3 may function as the mirror. In this case, it is recommended that a region of the display screen 30 closest to a position of the touch operation by the user should function as the mirror on the display apparatus 3.

In the foregoing first embodiment, the region of the display image 5 corresponding to the operation button 4 that the user pressed is caused to be the black image. However, the region of the display image 5 to be the black image may be selected by press of an operation button by the user.

In the foregoing third embodiment, the position determination part 20c determines the sound occurrence position based on comparison between strengths of the audio signals from the two microphones 6. However, the sound occurrence position may be determined by another method. For example, the position determination part 20c may perform an audio identification process based on the audio signals from the microphones 6, and in a case where the position determination part 20c detects a predetermined sound (e.g. a cry of a child), the position determination part 20c may determine a position of the cabin of the vehicle associated beforehand with the identified sound as the sound occurrence position.

In the foregoing embodiments, once the predetermined time period passes after the partial region of the display screen 30 of the display apparatus 3 functions as the mirror, the image processing apparatus 2 moves back to the normal state. On the other hand, in a case where the user performs a predetermined operation, the image processing apparatus 2 may move back to the normal state.

In the foregoing embodiments, the function described as one block is not necessarily implemented by a single physical element, but may be implemented by separate physical elements. Further, in the foregoing embodiments, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses.

Moreover, in the foregoing embodiments, any or all of the functions described to be implemented by software by executing programs may be implemented by electrical hardware circuit, and any or all of the functions described to be implemented by electrical hardware circuit may be implemented by software. Also, the function described as one block in the foregoing embodiments may be implemented by the cooperation of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that generates a display image to be displayed on a display screen of a display apparatus provided in a cabin of a vehicle, the display screen of the display apparatus including a one-way mirror, the image processing apparatus comprising:
   an image signal input that obtains a captured image signal representing a captured image captured by a camera that captures an image of surroundings of the vehicle;
   an image generator that generates the display image from the captured image signal;
   an image output that outputs the display image to the display apparatus to cause the display image to be displayed on the display screen of the display apparatus; and
   a processor that controls the image generator to cause a partial region of the display image to be a black image so that a portion of the display screen at which the black image is displayed functions as a mirror, wherein:
   the processor accepts a region specified by a user on the display screen of the display apparatus as a specified region of the display image, and
   the processor controls the image generator to cause the specified region of the display image to be the black image.

2. The image processing apparatus according to claim 1, further comprising:
   an operation signal input that receives an operation signal corresponding to an input operation made by a user, wherein
   the processor controls the image generator to select a region of the display image to be the black image according to the operation signal.

3. An image processing apparatus that generates a display image to be displayed on a display screen of a display apparatus provided in a cabin of a vehicle, the display screen of the display apparatus including a one-way mirror, the image processing apparatus comprising:
   an image signal input that obtains a captured image signal representing a captured image captured by a camera that captures an image of surroundings of the vehicle;
   an image generator that generates the display image from the captured image signal;
   an image output that outputs the display image to the display apparatus to cause the display image to be displayed on the display screen of the display apparatus;
   a processor that controls the image generator to cause a partial region of the display image to be a black image so that a portion of the display screen at which the black image is displayed functions as a mirror; and
   a detector that detects a sound that occurs in the cabin of the vehicle;
   wherein the processor determines an occurrence position of the sound in the cabin of the vehicle detected by the detector, and
   in a case where the detector detected the sound in the cabin of the vehicle, the processor controls the image generator to cause a region of the display image corresponding to the occurrence position of the sound in the cabin of the vehicle to be the black image so that the position of the sound in the cabin of the vehicle can be viewed in the portion of the display screen that functions as the mirror.

4. An image processing method of generating a display image to be displayed on a display screen of a display apparatus provided in a cabin of a vehicle, the display screen of the display apparatus including a one-way mirror, the image processing method comprising the steps of:
   (a) obtaining a captured image signal representing a captured image captured by a camera that captures an image of surroundings of the vehicle;
   (b) generating, with an image generator, the display image from the captured image signal; and (c) outputting the display image to the display apparatus to cause the display image to be displayed on the display screen of the display apparatus, wherein the step (b) includes a processor controlling the image generator to cause a partial region of the display image to be a black image so that a portion of the display screen at which the black image is displayed functions as a mirror, wherein:

the step (b) includes the processor accepting a region specified by a user on the display screen of the display apparatus as a specified region of the display image, the step (b) includes the processor controlling the image generator to cause the specified region of the display image to be the black image.

5. The image processing method according to claim 4, further comprising the step:

(d) the processor receiving an operation signal corresponding to an input operation made by a user, wherein the step (b) includes the processor controlling the image generator to select a region of the display image to be the black image according to the operation signal.

6. The image processing method according to claim 4, further comprising the steps:

(f) detecting, with a detector, a sound that occurs in the cabin of the vehicle; and (g) determining, with the processor, an occurrence position of the sound detected by the detector, wherein in a case where the step (f) detected the sound, the step (b) includes the processor controlling the image generator to cause a region of the display image corresponding to the occurrence position of the sound to be the black image.

* * * * *